March 12, 1929.   W. E. HIGBY   1,704,895
POWER SYSTEM FOR AIRPLANES, ETC
Filed Jan. 24, 1928
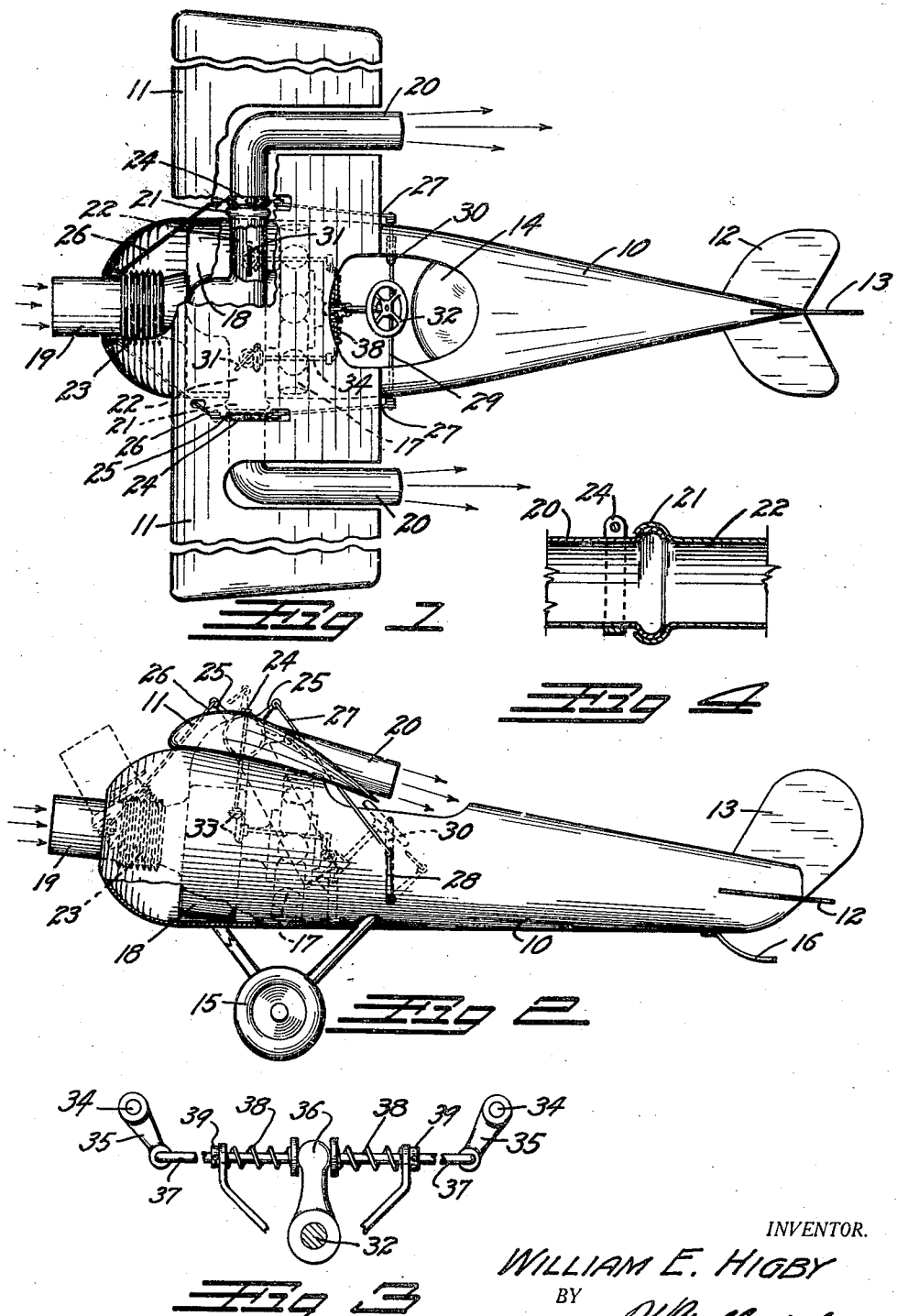
INVENTOR.
WILLIAM E. HIGBY
BY
ATTORNEY.

Patented Mar. 12, 1929.

1,704,895

UNITED STATES PATENT OFFICE.

WILLIAM E. HIGBY, OF MONUMENT, COLORADO.

POWER SYSTEM FOR AIRPLANES, ETC.

Application filed January 24, 1928. Serial No. 249,091.

This invention relates to a method for propelling an airplane. It has for its principal object the provision of an airplane which will be propelled in the air or along on the ground by means of a blast of air projected from the plane.

Another object of the invention is to provide an airplane which will be guided both as to vertical and lateral direction by means of air blasts which are adjustable both for direction and intensity.

Other objects and advantages reside in the detail construction of the invention, which is designed for simplicity, economy, and efficiency. These will become more apparent from the following description.

In the following detailed description of the invention reference is had to the acccompanying drawing which forms a part hereof. Like numerals refer to like parts in all views of the drawing and throughout the description.

In the drawing:

Fig. 1 is a plan view of an airplane in which my invention is embodied.

Fig. 2 is a side elevation thereof.

Fig. 3 is a detail view illustrating the control mechanism for the draft dampers.

Fig. 4 is a detail view illustrating the rotatable joint in the air blast pipes.

In the drawings, the various parts of a typical airplane are indicated by numerals as follows: fuselage 10, wings 11, vertical rudder 12, horizontal stabilizer 13, cockpit 14, wheel carriage 15, and tail skid 16.

Forwardly of the cockpit 14 any of the usual engines may be placed, as indicated at 17. This engine is employed to drive a centrifugal fan, the housing of which is indicated at 18. The fan 18 intakes from an intake pipe 19 which projects from the nose of the fuselage 10 and discharges through a pair of discharge pipes 20, one of which projects rearwardly from each of the wings 11.

The discharge pipes 20 each contain a rotatable joint 21, illustrated in detail in Fig. 4, so that their extremities, which are L shaped, may be rotated on the extremities of the short stationary portions 22 of the discharge pipe. The intake pipe 19 is provided with a bellows joint 23 which allows the forward extremity of the intake pipe to be turned from a position in alignment with the axis of the fuselage to an upwardly projecting angle, as indicated in broken line in Fig. 2. Any suitable joint may be employed in place of the bellows 23 such as a ball and socket, or loose sleeve joint if desired.

Adjacent the rotatable joints 21 in the discharge pipes fixed rings 24 are secured from each of which a pair of levers 25 project. The rearward lever 25 of each of the rings 24 is connected by means of a connecting rod 27 to a lever 28, one of which is placed on each of the extremities of a control shaft 29. The control shaft 29 may be turned by means of a control lever 30 which is placed conveniently to the operator in the cockpit 14.

By means of this arrangement, the projected blast of air can be directed at any desired rearward and downward angle and the air can be drawn inward at any desired forward and upward angle. Thus the blast can be used to assist in lifting the plane from the ground by directing it at a substantial downward angle. The lifting action is assisted by the intake pipe 19 which turns upwardly as the discharge pipes turn downwardly and creates a vacuum over the nose of the plane. As the plane reaches the desired height the intake and discharge pipes can be straightened by means of the lever 30 to a more nearly horizontal position where they will act to drive the plane forwardly, it depending then upon the wing section for its lift.

With this invention there is no need for a vertical rudder, merely a stabilizer 13 being provided. The lateral movements of the plane are controlled by varying the relative force of the blast in the respective discharge pipes 20. This is accomplished by means of blast dampers 31 which are placed in the short discharge pipes 22 and controlled in any desired manner from a steering wheel 32.

The damper control as illustrated comprises two pairs of bevel gears 33. One gear of each pair is placed on the extremity of one of the damper shafts, and the other gear of each pair being placed on one of a pair of short parallel counter shafts 34. The counter shafts 34 extends rearwardly and terminate in levers 35. On the extremity of the steering wheel shaft a lever 36 is placed. Push rods 37 extend from the levers 35 into contact with the lever 36 and are maintained in contact therewith by means of springs 38. Collars 39 limit the inward movements of the push rods.

By this arrangement, rotation of the steering wheel to the left causes the lever 36 to push on the left hand push rod and close the damper in the left hand blast pipe thus directing the majority of the air blast through the right hand pipe which will act to swing the plane in a left circle. To turn in a right circle, the steering wheel is turned toward the right which allows the left hand damper to open and closes the right hand damper, thus creating a stronger blast in the left hand discharge pipe which swings the plane in a right circle.

The discharge pipes are for the most part concealed within the structure of the wings 11. To lessen the thickness of the wing the pipes can be made to have a cross section conforming to the shape of the wing, instead of round as shown, if desired.

The rotatable joint 21 may be constructed in any desired manner which will allow the L shaped extremity to be turned on the stationary portions 22. As illustrated, an annular bead is formed on the extremity of the portions 22 which slides upon a similar bead formed upon the L shaped extremities, as shown in Fig. 4.

While the invention has been described as particularly applicable to an airplane it is easily conceivable that it might be employed for driving and guiding other types of vehicles and it is desired to be understood that all such adaptions are within the conception of the invention.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A power system for airplanes and the like comprising a motor; a fan driven by said motor; a housing surrounding said fan; an intake pipe to said housing opening forwardly of said airplane; a pair of discharge pipes for said housing, one of said discharge pipes being placed on each side of the longitudinal axis of said plane so as to direct an air blast rearwardly therefrom; means for simultaneously varying the angle of discharge of said discharge pipes and the angle of intake of said intake pipe.

2. A power system for airplanes and the like comprising a motor; a fan driven by said motor; a housing surrounding said fan; an intake pipe to said housing opening forwardly of said airplane; a pair of discharge pipes for said housing, one of said discharge pipes being placed on each side of the longitudinal axis of said plane so as to direct an air blast rearwardly therefrom; means for varying the angle of discharge of said discharge pipes; and other means for varying the angle of intake of said intake pipe, said two means arranged to operate simultaneously and in unison with each other.

3. A power system for airplanes and the like comprising a motor; a fan driven by said motor; a housing surrounding said fan; an intake pipe to said housing opening forwardly of said airplane; a pair of discharge pipes for said housing, one of said discharge pipes being placed on each side of the longitudinal axis of said plane so as to direct an air blast rearwardly therefrom; means for varying the angle of intake of said intake pipe and means for varying the angle of said discharge pipes, said means being arranged for manual control by the airplane operator and operatively connected so that said intake pipe will turn upwardly as said discharge pipes turn downwardly.

4. A power system for airplanes and the like comprising a motor; a fan driven by said motor; a housing surrounding said fan; an intake pipe to said housing opening forwardly of said airplane; and a pair of discharge pipes for said housing, one of said discharge pipes being placed on each side of the longitudinal axis of said plane so as to direct an air blast rearwardly therefrom; a damper in each of said discharge pipes and means for operating said dampers so that a greater blast of air can be discharged from either one of said pipes than from the other of said pipes, said greater blast acting to guide said plane; and means for controlling said dampers, said means comprising a system for transmitting mechanical motion and a steering apparatus manually operated to control said system; said steering apparatus comprising a steering shaft; a lever projecting from said shaft; push rods adapted to contact with each side of said lever; springs for maintaining said push rods in contact with said lever; and stops adapted to limit the inside movement of said push rods; each of said push rods being operatively connected with one of said dampers.

In testimony whereof, I affix my signature.

WILLIAM E. HIGBY.